US012692072B2

(12) United States Patent
Mohanarajah et al.

(10) Patent No.: US 12,692,072 B2
(45) Date of Patent: Jul. 28, 2026

(54) AUTOMATED STORAGE AND RETRIEVAL SYSTEM

(71) Applicant: Rapyuta Robotics Co., Ltd., Tokyo (JP)

(72) Inventors: Gajamohan Mohanarajah, Tokyo (JP); Arudchelvan Krishnamoorthy, Tokyo (JP)

(73) Assignee: Rapyuta Robotics Co., Ltd., Tokyo (JP)

( * ) Notice: Subject to any disclaimer, the term of this patent is extended or adjusted under 35 U.S.C. 154(b) by 635 days.

(21) Appl. No.: 18/164,620

(22) Filed: Feb. 6, 2023

(65) Prior Publication Data

US 2023/0278799 A1 Sep. 7, 2023

Related U.S. Application Data

(60) Provisional application No. 63/482,805, filed on Feb. 2, 2023, provisional application No. 63/315,563, filed on Mar. 2, 2022.

(51) Int. Cl.
B25J 9/16 (2006.01)
B25J 13/00 (2006.01)
(Continued)

(52) U.S. Cl.
CPC ............ B65G 1/0492 (2013.01); B25J 9/161 (2013.01); B25J 9/1674 (2013.01); B25J 9/1676 (2013.01);
(Continued)

(58) Field of Classification Search
CPC .. B65G 1/0492; B65G 1/0471; B65G 1/0478; B65G 1/06; B65G 1/065; B65G 1/10;
(Continued)

(56) References Cited

U.S. PATENT DOCUMENTS 11,097,897 B1 8/2021 Theobald
2015/0314960 A1* 11/2015 Yap ........................ B65G 1/137
414/807

(Continued)

FOREIGN PATENT DOCUMENTS

DE 10 2020 115619 A1 12/2021
EP 2 949 605 B1 7/2017
(Continued)

OTHER PUBLICATIONS

International Search Report and Written Opinion mailed on Apr. 4, 2023 in the PCT Application No. PCT/JP2023/006764.
(Continued)

*Primary Examiner* — Thomas Randazzo
(74) *Attorney, Agent, or Firm* — Trupti P. Joshi

(57) ABSTRACT

There is provided an automated storage and retrieval system including: a rack storing a plurality of bins for containing items; a picking station for picking the item from the bin; and a transportation robot for transporting the bin between the rack and the picking station. The picking station defines a plurality of picking positions at which a plurality of the transportation robots transporting the bins are simultaneously aligned to enable picking work of the item from the bin.

19 Claims, 9 Drawing Sheets

(51) Int. Cl.

| | |
|---|---|
| *B65G 1/04* | (2006.01) |
| *B65G 1/06* | (2006.01) |
| *B65G 1/10* | (2006.01) |
| *B65G 1/127* | (2006.01) |
| *B65G 1/137* | (2006.01) |
| *G05B 19/418* | (2006.01) |
| *G06Q 10/087* | (2023.01) |
| *B25J 5/00* | (2006.01) |

(52) U.S. Cl.
CPC .......... *B25J 13/006* (2013.01); *B65G 1/0471* (2013.01); *B65G 1/0478* (2013.01); *B65G 1/06* (2013.01); *B65G 1/065* (2013.01); *B65G 1/10* (2013.01); *B65G 1/127* (2013.01); *B65G 1/1371* (2013.01); *B65G 1/1373* (2013.01); *B65G 1/1378* (2013.01); *G05B 19/418* (2013.01); *G06Q 10/087* (2013.01); *B25J 5/007* (2013.01); *B65G 2201/0235* (2013.01); *B65G 2201/0258* (2013.01); *B65G 2203/0233* (2013.01); *B65G 2203/0283* (2013.01); *B65G 2811/0678* (2013.01)

(58) Field of Classification Search
CPC .... B65G 1/127; B65G 1/1371; B65G 1/1373; B65G 1/1378; B65G 2201/0235; B65G 2201/0258; B65G 2203/0233; B65G 2203/0283; B65G 2811/0678; B65G 1/04; B25J 9/161; B25J 9/1676; B25J 13/006; B25J 5/007; G05B 19/418; G05B 2219/31043
See application file for complete search history.

(56) References Cited

U.S. PATENT DOCUMENTS

| | | | |
|---|---|---|---|
| 2016/0009493 A1* | 1/2016 | Stevens ................ | G06Q 10/087 |
| | | | 700/216 |
| 2017/0267452 A1 | 9/2017 | Goren et al. | |
| 2020/0039748 A1* | 2/2020 | Khodl .................. | G06Q 10/087 |
| 2021/0221615 A1* | 7/2021 | Buchmann ........... | B65G 1/1373 |
| 2021/0300681 A1* | 9/2021 | Fuji ...................... | B65G 1/1378 |
| 2022/0106122 A1 | 4/2022 | Tie | |
| 2022/0411190 A1* | 12/2022 | Ogawa ............. | G05B 19/41895 |
| 2023/0174305 A1* | 6/2023 | Li ......................... | B65G 1/0492 |
| | | | 700/216 |
| 2023/0242338 A1* | 8/2023 | Winkler ................. | B65G 61/00 |
| | | | 414/277 |

FOREIGN PATENT DOCUMENTS

| | | | |
|---|---|---|---|
| JP | 06-024506 A | 2/1994 | |
| JP | 2017-522247 A | 8/2017 | |
| JP | 2018-516824 A | 6/2018 | |
| KR | 2022 0011169 A | 1/2022 | |
| WO | WO 2021/122218 A1 | 6/2021 | |
| WO | WO 2021/218931 A1 | 11/2021 | |

OTHER PUBLICATIONS

EP Search Report and Written Opinion mailed on Mar. 19, 2026, in the EP Application No. 23 763 363.1.

* cited by examiner

1

10

20

20

11

20

11

11

20

30

16

40

43A~43D        41A~41D 42        42        60        20

11

30        30

11

101

9F

8F

7F

6F

5F

4F

3F

2F

1F z x        y

AUTOMATED STORAGE AND RETRIEVAL SYSTEM

CROSS-REFERENCE TO RELATED APPLICATIONS

The present application claims the benefit of priority to U.S. Provisional Application No. 63/315,563 filed on Mar. 2, 2022, and U.S. Provisional Application No. 63,482/805 filed on Feb. 2, 2023, the contents of each of which are hereby incorporated by reference in their entirety.

TECHNICAL FIELD

The present disclosure generally relates to a warehouse system such as an Automated Storage and Retrieval System (an ASRS or an AS/RS).

BACKGROUND

As Electronic Commerce (EC) markets expand, improvement of item storage efficiency and item picking work efficiency for logistics has become a great problem. In order to resolve this problem, for example, WO2018/189110 A1 discloses a warehouse. This warehouse is partitioned into a storage area 10 and an order preparation area 11. Rack 100 storing trays 102 for containing storage target products are arranged in the storage area 10. On the other hand, order preparation stations 12 for operators 13 to process orders are arranged in the order preparation area 11.

To process an order, an automated device 103 transports the tray 102 containing an order target product from the rack 100 to the order preparation station 12. Subsequently, in the order preparation area 11, the tray 102 is transported to in front of the operator 13 by, for example, another operator other than the operator 13, or another system (e.g., conveyer). The operator 13 picks the product from the tray 102, and sorts the picked product as a transportation package 14. It is demanded to make such work more efficient in response to expansion of the EC markets.

The present disclosure has been made in light of the above problem, and an object of the present disclosure is to provide an automated storage and retrieval system which can substantially improve efficiency of picking work of items.

SUMMARY

In order to achieve the above object, according to one aspect of the present disclosure, an automated storage and retrieval system is provided, and the automated storage and retrieval system includes: a rack storing a plurality of bins for containing items; a picking station for picking the item from the bin; and a transportation robot for transporting the bin between the rack and the picking station, wherein the picking station defines a plurality of picking positions at which a plurality of the transportation robots transporting the bins are simultaneously aligned to enable picking work of the item from the bin.

In such this automated storage and retrieval system, the picking station further defines one or more loading positions at which a plurality of shipment bins for loading the items are arranged.

In such automated storage and retrieval system, the rack includes a plurality of floors each of which stores the plurality of bins and allows the transportation robot run along a surface thereof, and one or more transportation elevators for transporting the transportation robot between the plurality of floors, and wherein the plurality of picking positions is defined on at least one of the floors.

The plurality of picking positions is defined at an edge of the floor which continues from the surface of the floor.

A plurality of the picking stations is defined at the rack. The transportation robot is configured to be able to transport the bin between the plurality of picking stations.

The plurality of bins is received on the floor by a plurality of support legs extending from bottom surfaces of the plurality of bins, and the transportation robot is configured to be able to enter a space below the bin between a bottom surface of the bin and the floor, and supports the bin so as to enable transportation of the bin by lifting the bottom surface of the bin in the space below.

Each of the plurality of floors defines a storage area storing the plurality of bins, and a movement route allowing the transportation robot to run outside the storage area, and each of the plurality of bins faces the movement passage.

The storage area of the floor allows the transportation robot to run.

An outline of the transportation robot is defined on an inner side of an outline of the bin in plan view in a case where the transportation robot enters the space below the bin.

The bin containing an item of a higher inventory turnover ratio is stored in a floor below the plurality of floors.

The transportation robot which has transported the bin to the picking station stays in a space below the bin at the picking station during the picking work at the picking station.

The transportation robot operates to return the bin from the picking station to the rack after the picking work at the picking station.

DESCRIPTION OF EMBODIMENTS

Figure 1:
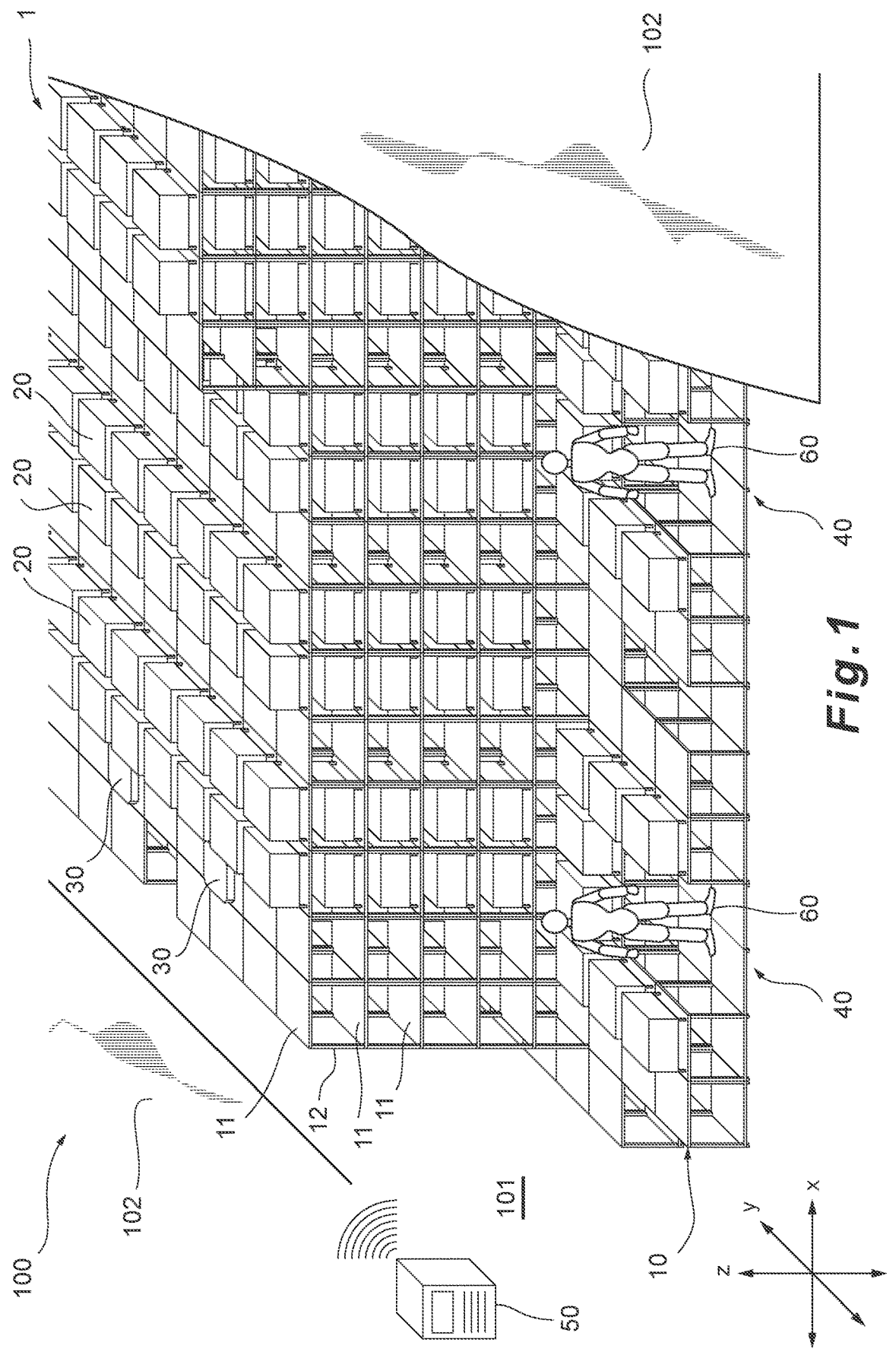
FIG. 1 is a perspective view schematically illustrating an external appearance of an automated storage and retrieval system 1 according to an embodiment of the present disclosure.

Hereinafter, an embodiment of the present disclosure will be described with reference to the accompanying drawings. In all drawings, identical reference numerals are used to refer to identical or similar components. The following embodiment does not intend to limit the invention recited in the claims. Examples and features of the disclosed principal will be described in this description, yet can be changed and modified without departing from the idea and the scope of the disclosed embodiment. Furthermore, specific features, structures, or characteristics can be combined by an arbitrary appropriate method in one or more embodiments. The following detailed description is taken into account only as exemplary description, and the true range and idea are intended to be indicated by the claims.

FIG. 1 is a perspective view schematically illustrating an external appearance of an automated storage and retrieval system 1 according to an embodiment of the present disclosure. The automated storage and retrieval system 1 is constructed in, for example, a building 100. The building 100 includes a floor surface 101 extending along a horizontal plane, a plurality of sidewalls 102 vertically standing from the floor surface 101, and a ceiling (not illustrated) supported by the plurality of sidewalls 102. For example, the four sidewalls 102 surrounding four sides, and the ceiling extending in parallel to the floor surface 101 establish an internal space between the floor surface 101, and the sidewalls 102 and the ceiling. The automated storage and retrieval system 1 is constructed in this internal space. Note that part of the sidewalls 102 are cut out for ease of description in FIG. 1. In the building 100, an x axis and a y axis extending in a direction perpendicular to each other on the horizontal plane, and a z axis extending in a vertical direction and perpendicular to the x axis and the y axis are defined.

The automated storage and retrieval system 1 is an automated storage and retrieval system which can automate a series of work from warehousing and storage to delivery of items including products and the like based on centralized management. The automated storage and retrieval system 1 according to the present embodiment includes a rack 10 arranged on the floor surface 101, a plurality of storage bins 20 which is containers stored in the rack 10, a plurality of transportation robots 30 for transporting the storage bins 20, one or more picking stations 40 for picking items including products and the like contained in the storage bins 20, and a management server 50 for managing the series of work of the automated storage and retrieval system 1. At the picking station 40, a human operator 60 performs picking work of picking an item from the storage bin 20.

The rack 10 includes a plurality of floors 11, each of floors 11 defining a surface which extends in parallel to each other along each xy plane, and a plurality of support columns 12 supporting the plurality of floors 11. In the present embodiment, the floors 11 of a first floor to a ninth floor vertically standing in a z axis direction from the floor surface 101 are formed. A total height of the rack 10 from the floor surface

101 in the z axis direction can be set according to a height in the z axis direction of the ceiling of the building 100. Note that part of the floors 11 of the eighth floor and the ninth floor is omitted for ease of description in FIG. 1, and configurations of the floors 11 of the eighth floor and the ninth floor are configured similar to the floor 11 of the seventh floor.

Figure 2:
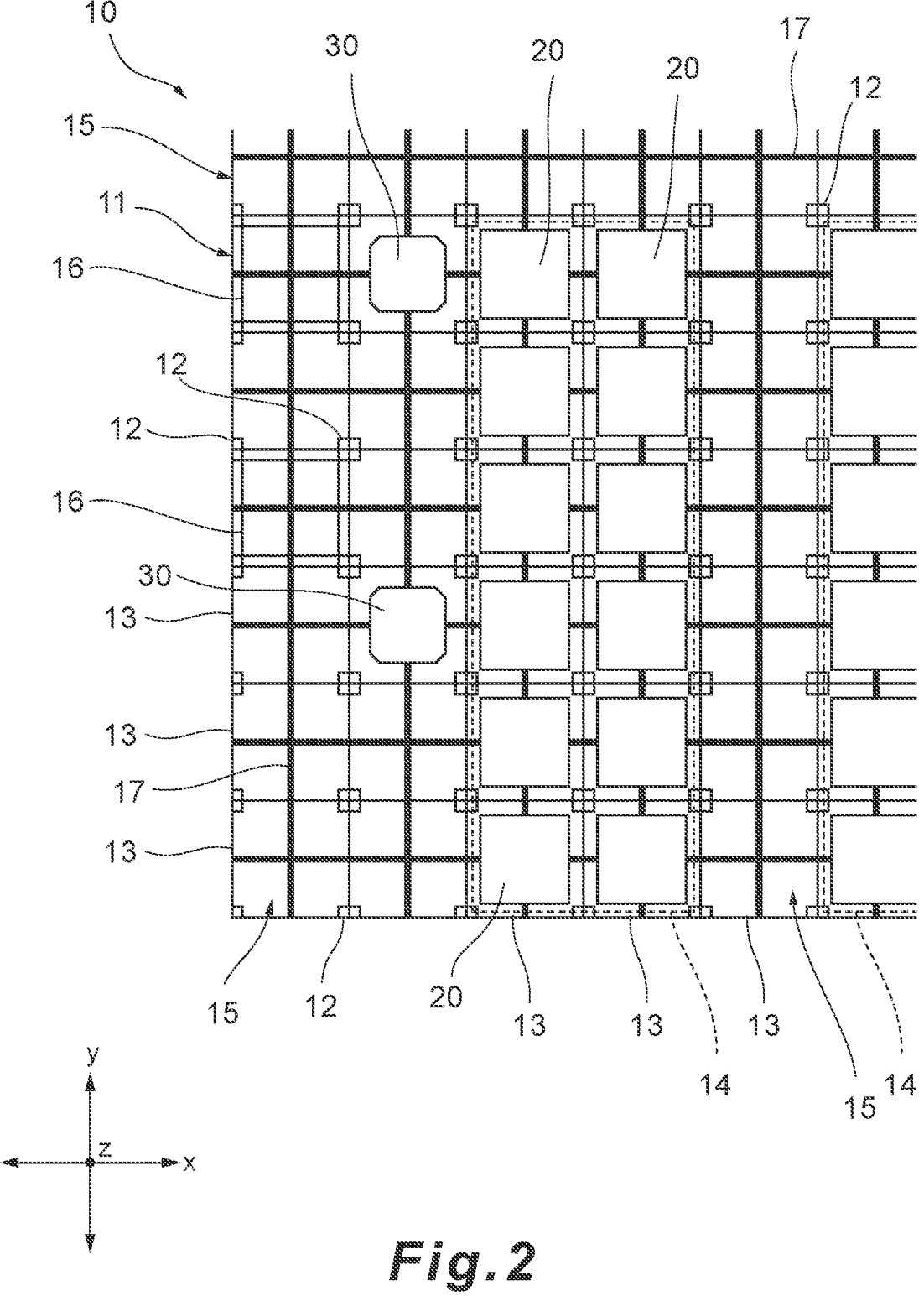
FIG. 2 is a plan view schematically illustrating an example of a structure of floors 11 of a rack 10 of the automated storage and retrieval system 1 according to the present embodiment.

FIG. 2 is a plan view schematically illustrating an example of a structure of the floor 11 of the rack 10 of the automated storage and retrieval system 1 according to the present embodiment. In the present embodiment, each floor 11 of the rack 10 defines a plurality of sections 13 aligned along the xy plane. The section 13 defines, for example, outlines of a square or a rectangle in plan view. In the present embodiment, the support columns 12 are respectively arranged at four corners of the one section 13. The one storage bin 20 occupies the one section 13. Similarly, the one transportation robot 30 occupies the one section 13. That is, an outline of the storage bin 20 and an outline of the transportation robot 30 are respectively arranged in the outline of the one section 13 in plan view. Furthermore, an interval between a pair of the mutually neighboring support columns 12, 12 is set larger than widths of the transportation robot 30 and the storage bin 20 defined in an x axis direction and a y axis direction.

Each floor 11 defines storage areas 14 including the sections 13 in which the storage bins 20 are aligned, and movement passages 15 of the transportation robots 30 including the sections 13 other than the storage areas 14. In the present embodiment, for example, two rows of bin groups of the plurality of storage bins 20 aligned along the y axis direction are aligned in the x axis direction in the storage area 14. That is, all of the storage bins 20 making up the bin group of these two rows of the storage bins 20 face the movement passages 15 at all times. On the other hand, the transportation robots 30 can run on the movement passages 15. As described later, the transportation robot 30 can also run in the storage area 14, through a space below a bottom surface of the storage bin 20.

Figure 3:
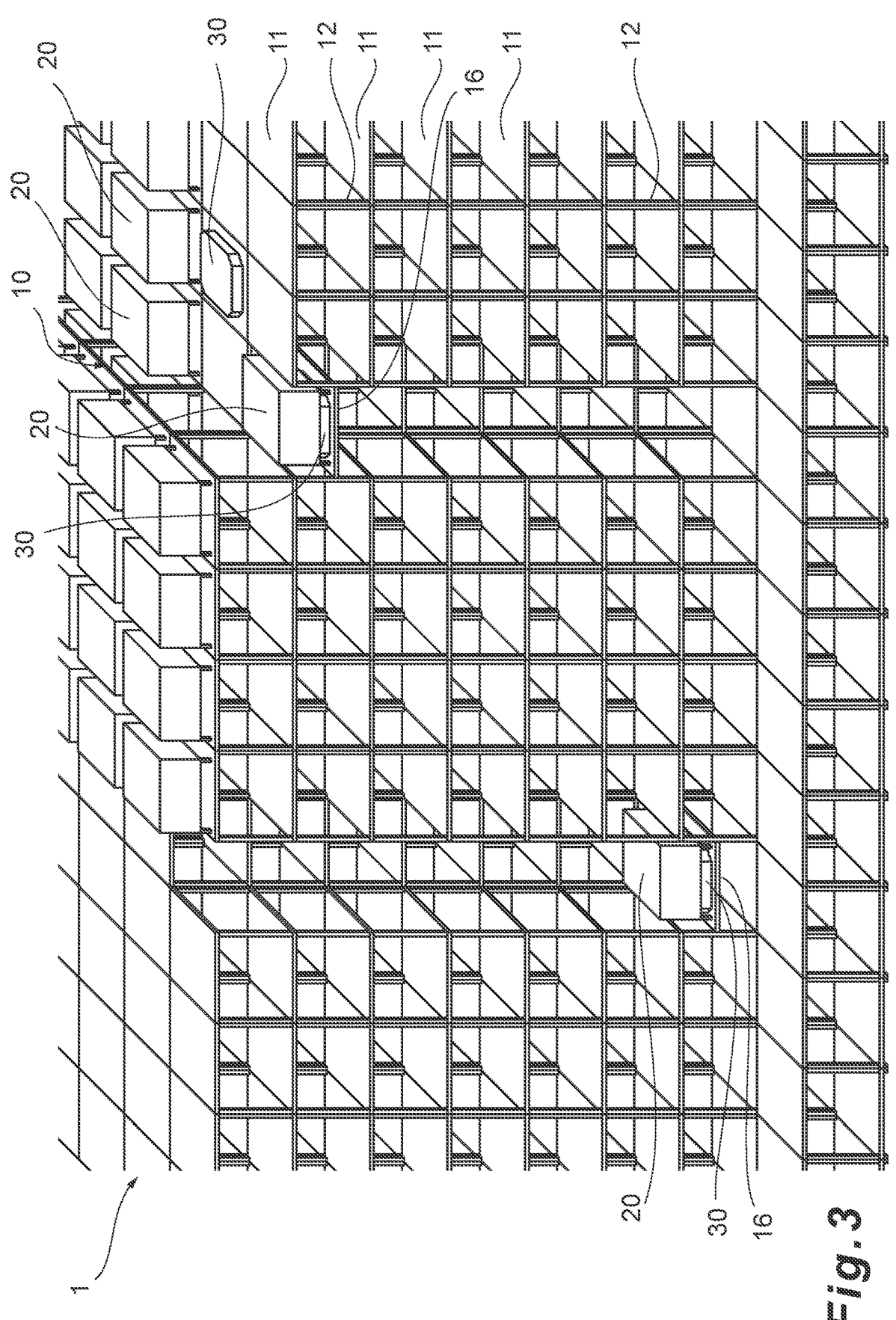
FIG. 3 is a perspective view schematically illustrating an example of a structure of the rack 10 of the automated storage and retrieval system 1 according to the embodiment.

FIG. 3 is a perspective schematically illustrating an example of a structure of the rack 10 of the automated storage and retrieval system 1 according to the embodiment. Referring to FIGS. 1 to 3, the rack 10 includes one or more transportation elevators 16. The transportation elevators 16 can make reciprocating movement in the z axis direction from the first floor to the ninth floor of the floors 11, and stop each floor 11. Each transportation elevator 16 is arranged in one section 13 in the movement passage 15 of the transportation robot 30 on each floor 11. In the present embodiment, the plurality of transportation elevators 16 may be provided to the rack 10. The transportation elevator 16 can have only the transportation robot 30 get thereon or have the transportation robot 30 holding the storage bin 20 get thereon to transport to each floor of the first floor to the ninth floor.

The transportation elevator 16 includes, for example, shafts of four corners attached to the rack 10 and extend in the z axis direction, four roller chains attached to the respective shafts, and extend in the z axis direction, four sprockets meshing with the respective chains, and two electric motors (both of which are not illustrated) for respectively rotating and driving, for example, the two sprockets. The sprockets mesh with the roller chains in response to rotation of the sprockets caused by the electric motors to ascend and descend the transportation elevator 16. Note that the support columns 12 making up the rack 10 may be used in place of the shafts. The above mechanism is a mere example, and an arbitrary another mechanism realizing vertical movement of the transportation elevator 16 may be used.

Figure 4:
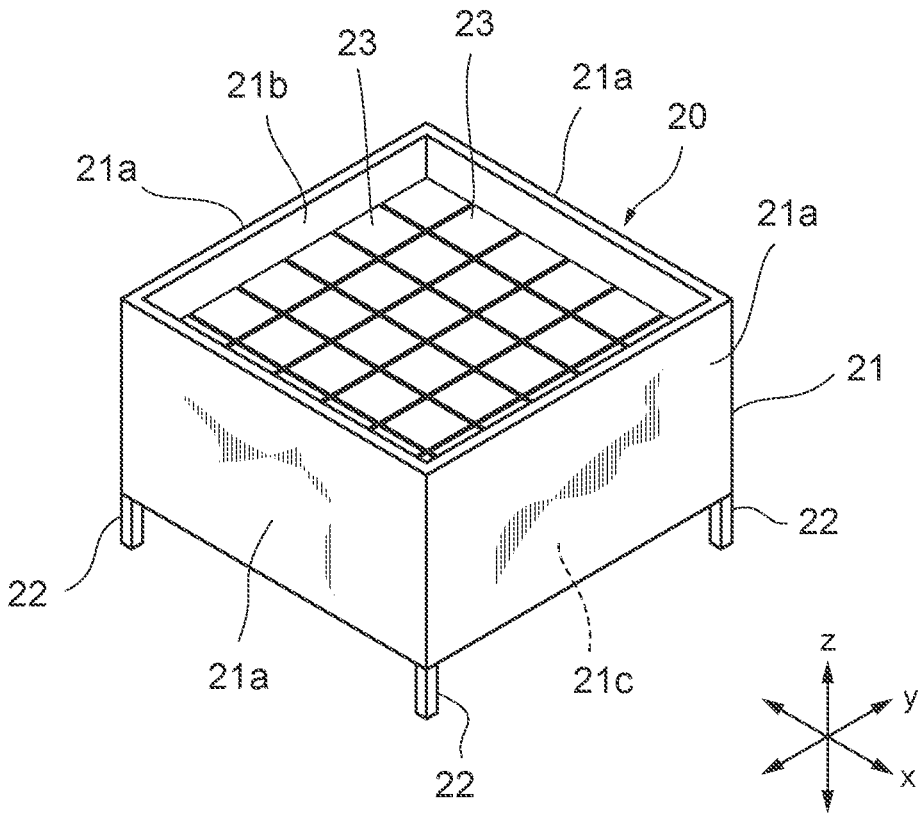
FIG. 4 schematically illustrates an example of a structure of a storage bin 20 of the automated storage and retrieval system 1 according to the embodiment.

FIG. 4 schematically illustrates an example of the structure of the storage bin 20 of the automated storage and retrieval system 1 according to the embodiment. In the present embodiment, the storage bin 20 includes a bin main body 21 defining an internal space of, for example, a cuboid, and four support legs 22 extending downward from four corners of a bottom surface of the bin main body 21. The bin main body 21 includes four sidewalls 21*a* surrounding four sides, an opening part 21*b* opened along upper ends of the sidewalls 21*a*, and a bottom surface 21*c* closed along lower ends of the sidewalls 21*a*. Although the opening part 21*b* is opened in the present embodiment, the opening part 21*b* may be closed with, for example, a lid or a cover. The sidewalls 21*a* extend in parallel to, for example, the z axis. Furthermore, the bottom surface 21*c* extends along the xy plane. The storage bin 20 is received on the floor 11 by the four support legs 22. The storage bin 20 may be formed by, for example, a resin material. Furthermore, the storage bin 20 may be a foldable bin. An outline of the bin main body 21 in plan view is defined as a square or a rectangle. A size of the storage bin 20 is preferably set appropriately based on a size of the rack 10 or each floor 11 or a size of an item 23.

The one or more items 23 are contained in the internal space in the bin main body 21. The item 23 can be identified by, for example, a unique Stock Keeping Unit (SKU) set to the item 23. Although the item 23 is, for example, one unit of a product or the like, the item 23 may be a so-called case product packaged in a unit of a plurality of identical products. Furthermore, the one storage bin 20 may contain only the items 23 of one type, or may contain the items 23 of a plurality of types. The storage bin 20 can be identified based on a unique ID set to each storage bin 20. The unique ID of this storage bin 20 is managed in correspondence with the SKU of the item 23 contained in the storage bin 20.

Figure 5:
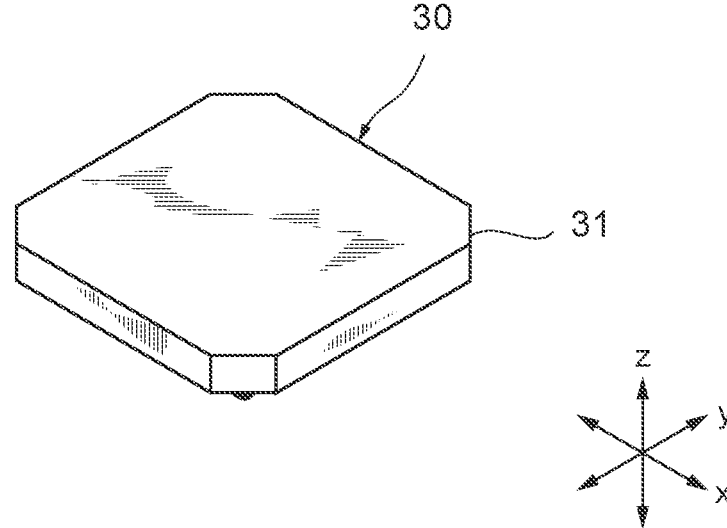
FIG. 5 is a perspective view schematically illustrating an external appearance of a transportation robot 30 of the automated storage and retrieval system 1 according to the embodiment.

FIG. 5 is a perspective view schematically illustrating an external appearance of the transportation robot 30 of the automated storage and retrieval system 1 according to the embodiment. In the present embodiment, a plurality of the transportation robots 30 is arranged on each floor 11 of the rack 10. The transportation robot 30 is, for example, an autonomous running transportation robot including a thin housing 31 of a substantially cuboid shape. The housing 31 is formed by, for example, a resin material. The transportation robot 30 can run along a line 17 (see, for example, FIG. 2) by tracing the line 17 drawn on the floor 11 of the rack 10 (line tracing function). The line 17 is two strips of lines. The two strips of lines extend passing center positions of the x axis direction and the y axis direction in, for example, each section 13, and are perpendicular to each other at a center of the section 13. These lines 17 are drawn in all of the sections 13 including the storage areas 14, the movement passages 15, and the transportation elevators 16 of the floor 11.

An upper surface of the housing 31 of the transportation robot 30 extends flat along the xy plane. A height of the transportation robot 30 is set smaller than the height of the support leg 22 of the storage bin 20. Furthermore, an outline of the housing 31 in top view is defined substantially as, for example, a square. Similarly, the length of one side of the transportation robot 30 is set smaller than the length of each side of the storage bin 20. That is, the transportation robot 30 can enter the space below the bin main body 21 from between the pair of mutually neighboring support legs 22 of the storage bin 20. In this regard, the size of the transportation robot 30 is preferably set appropriately based on sizes of the rack 10, each floor 11, and the storage bin 20.

Figure 6:
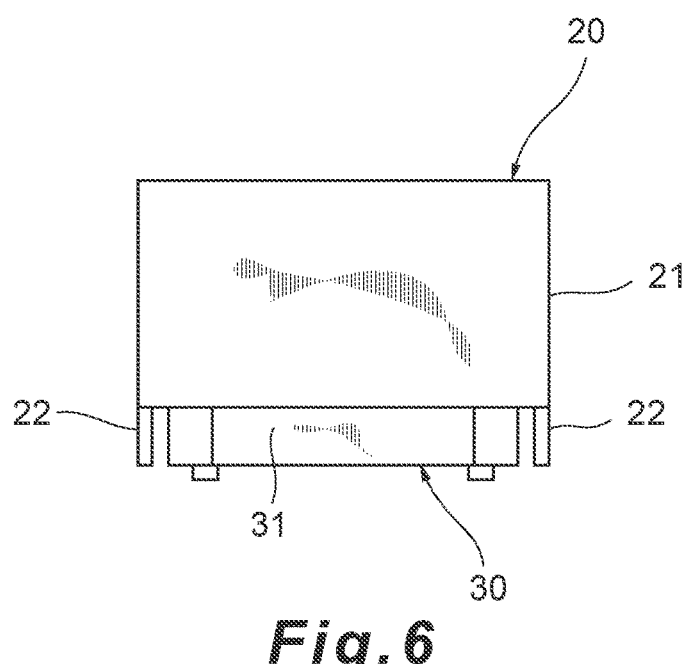
FIG. 6 is a side view illustrating a state where the transportation robot 30 of the automated storage and retrieval system 1 according to the embodiment lifts the storage bin 20.

The transportation robot 30 can change the height thereof between a first configuration where the height of the upper surface of the housing 31 is set to a first height, and a second configuration where the height is set to a second height higher than the first height. As described above, the transportation robot 30 of the first configuration can enter the space below the bin main body 21 from between the pair of mutually neighboring support legs 22 of the storage bin 20. In this case, when the transportation robot 30 changes the height of the housing 31 from the first configuration to the second configuration, the transportation robot 30 holds the storage bin 20 on the upper surface of the housing 31 as illustrated in FIG. 6. As a result, the storage bin 20 can be lifted from the floor 11. The transportation robot 30 can run in both of the first configuration and the second configuration. That is, the transportation robot 30 can run on the floor 11 while lifting the storage bin 20.

Back to FIG. 1, in the present embodiment, the picking station 40 is provided along, for example, an edge of the floor 11 which continues from the surface of the floor 11 of the rack 10. That is, the picking station 40 is provided in, for example, the rack 10. In the present embodiment, for example, the two picking stations 40 are provided on the floor 11 of the second floor of the rack 10. The picking station 40 is a station for picking the item 23 from the storage bin 20 transported by the transportation robot 30 from the rack 10. The operator 60 can execute picking work (delivery work) taking a standing posture on, for example, the surface of the floor 11 of the first floor. Note that details of a configuration of the picking station 40 will be described later.

The management server 50 manages all of the rack 10, the storage bins 20, the transportation robots 30, the transportation elevators 16, and the picking stations 40 for warehousing, storage, and delivery of the automated storage and retrieval system 1. This management is realized when a program stored in a storage unit is executed by a control unit as described later. More specifically, operations and processing of the transportation robots 30, the transportation elevators 16, and the picking stations 40 are executed according to information processing described in the program. That is, the information processing described in the program functions as specific means collaborated by software in correspondence with the program, and various hardware resources of the automated storage and retrieval system 1 when the program is read by the control unit.

Figure 7:
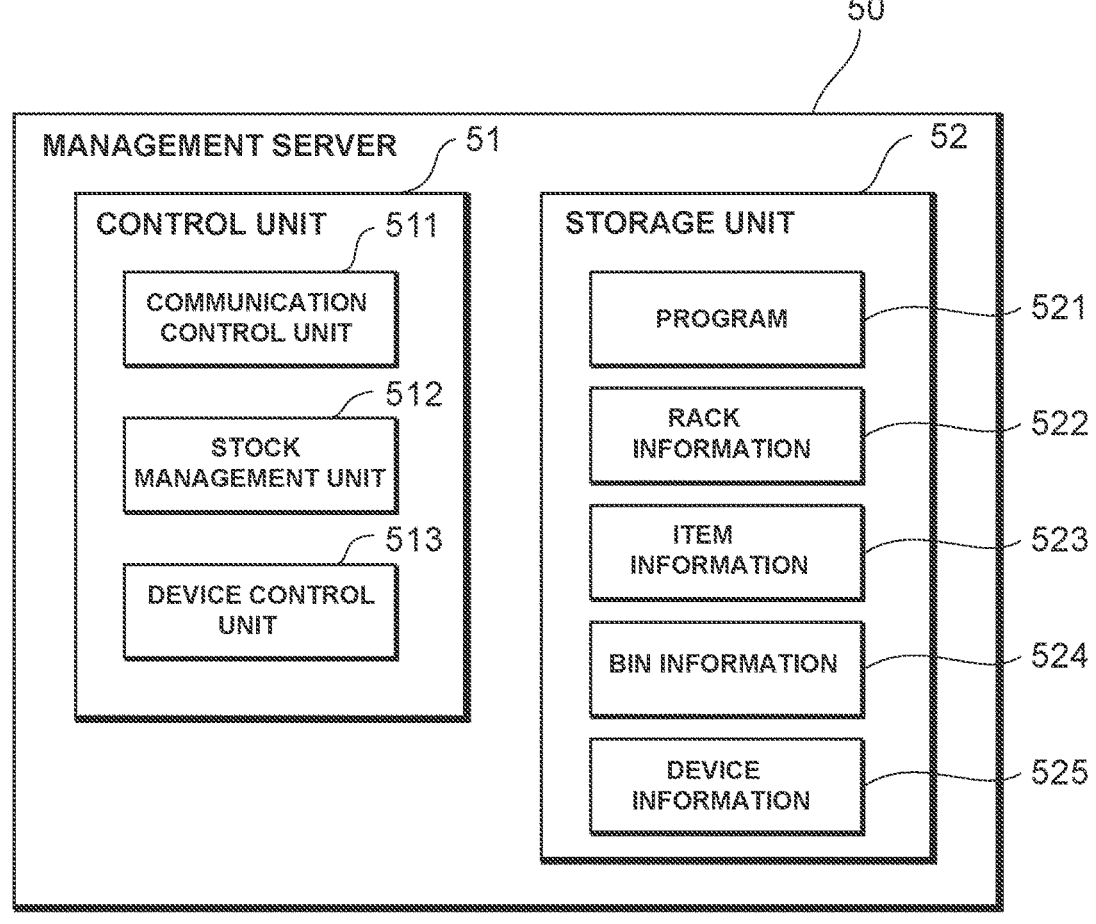
FIG. 7 is a functional block diagram schematically illustrating a configuration of a management server 50.

FIG. 7 is a functional block diagram schematically illustrating a configuration of the management server 50. As illustrated in FIG. 7, the management server 50 includes a control unit 51 and a storage unit 52. The control unit 51 includes a communication control unit 511, a stock management unit 512, and a device control unit 513. On the other hand, the storage unit 52 stores a program 521, rack information 522, item information 523, bin information 524, and device information 525. The control unit 51 manages the automated storage and retrieval system 1 by executing the program 521 stored in the storage unit 52. This management server 50 may be realized on a physical server, yet may be realized on, for example, a cloud server.

The communication control unit 511 controls communication between the management server 50 and at least the transportation robot 30 and a terminal of the operator 60 at the picking station 40. A communication method may be, for example, Wi-Fi (registered trademark), Ethernet (registered trademark), optic or the like. The stock management unit 512 manages a stock status of the automated storage and retrieval system 1. More specifically, the stock management unit 512 associates and manages information (SKU) for identifying each item 23, information related to the number of stocks of each item 23 specified based on the SKU, information (ID) for identifying the storage bin 20 in which the item 23 is contained, and information related to a position of the section 13 of the floor 11 in which the storage bin 20 is stored. Each of these pieces of information is stored as the rack information 522, the item information 523, and the bin information 524 in the storage unit 52.

The device control unit 513 manages and controls at least states and operations of the transportation robots 30 and the picking stations 40. More specifically, the device control unit 513 associates and manages information for identifying the transportation robot 30, information related to a current state of the transportation robot 30, i.e., a charging state of the transportation robot 30, information related to whether or not the transportation robot 30 engages in transportation, information related to order processing in which the transportation robot 30 engages in a case where the transportation robot 30 engages in the transportation, and information related to a current position of the transportation robot 30 at the floor 11 of the rack 10 or the picking station 40. The information related to the order processing includes, for example, information related to transportation of which item 23 of the order processing the transportation robot 30 engages in. Each of these pieces of information is stored as the device information 525 in the storage unit 52. Furthermore, the device control unit 513 associates and manages information for identifying the picking station 40, and information related to an order for which picking work is executed at the picking station 40. Each of these pieces of information is stored as the device information 525 in the storage unit 52.

Furthermore, the device control unit 513 generates commands for the transportation robot 30 and the transportation elevator 16 per order processed by the automated storage and retrieval system 1. More specifically, the device control unit 513 specifies the storage bin 20 for containing the item 23 designated by the order based on each of the above pieces of information, and specifies the transportation robot 30 which needs to be assigned to transport the storage bin 20. The device control unit 513 specifies a movement route R1 (referred to as a "robot route" below) of the transportation robot 30 to the section 13 in which the storage bin 20 is stored, and a movement route R2 (referred to as a "bin route" below) of the transportation robot 30 from the section 13 to the picking station 40 which is a destination. These pieces of generated information are transmitted as commands to the transportation robot 30 via the communication control unit 511.

Figure 8:
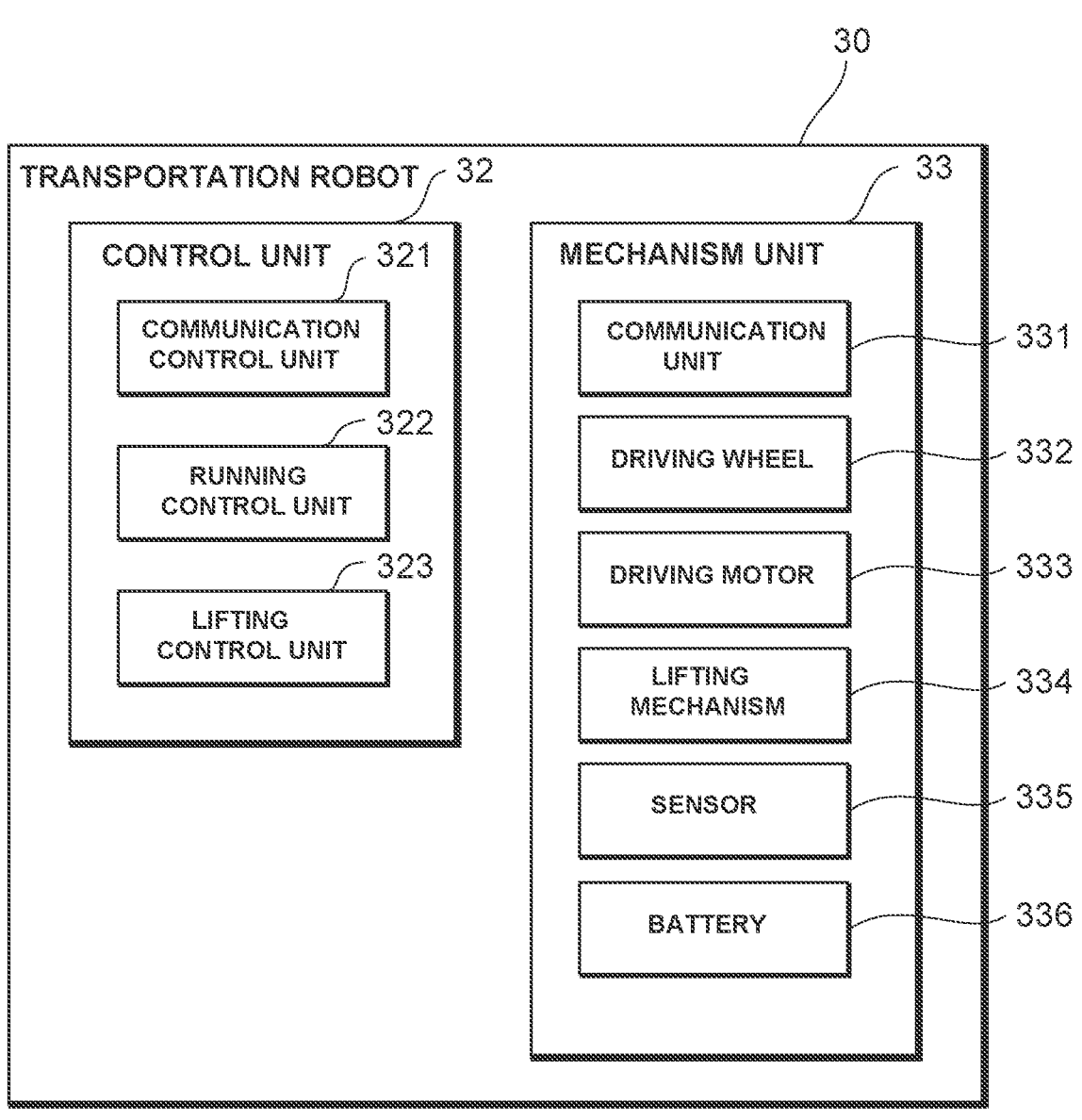
FIG. 8 is a functional block diagram schematically illustrating a configuration of the transportation robot 30.

FIG. 8 is a functional block diagram schematically illustrating a configuration of the transportation robot 30. As illustrated in FIG. 8, the transportation robot 30 includes a control unit 32 and a mechanism unit 33. The control unit 32 includes a communication control unit 321, a running control unit 322, and a lifting control unit 323. The mechanism unit 33 includes a communication unit 331, a plurality of driving wheels 332, a plurality of driving motors 333, a lifting mechanism 334, a sensor 335, and a battery 336. The control unit 32 controls an operation of the transportation robot 30 by executing a program (not illustrated) stored in the storage unit (not illustrated). The program may be stored in a physical storage unit incorporated in the transportation robot 30, yet may be stored on, for example, a cloud server.

The communication unit 331 establishes communication between at least the management server 50, the transportation elevator 16, and the terminal of the operator 60 at the picking station 40. A communication method may be, for example, Wi-Fi (registered trademark), Ethernet (registered trademark), optic or the like. Communication performed by the communication unit 331 is controlled by the communication control unit 321. The driving wheel 332 is a wheel for realizing running of the transportation robot 30. The plurality of driving motors 333 drives the driving wheels 332 and the lifting mechanism 334. Driving of the driving wheels 332 is controlled by the running control unit 322. The lifting mechanism 334 establishes the above-described first configuration and second configuration by lifting the housing 31 of the transportation robot 30. An operation of this lifting mechanism 334 is controlled by the lifting control unit 323.

The sensor 335 is, for example, an optical sensor for realizing the above-described line tracing function. More specifically, the sensor 335 is used to control running of the transportation robot 30 along the line 17 by reading a boundary of the line 17 drawn on each section 13. Furthermore, although the two strips of the lines 17 cross at the center of each section 13, the sensor 335 reads the line 17 perpendicular to the line 17 along which the transportation robot 30 is running, so that the transportation robot 30 can specify the center position of each section 13. Thus, the transportation robot 30 can stop at, for example, the center position of each section 13. The battery 336 is, for example, a rechargeable battery. On each floor 11 of the rack 10, one or more charging spots (not illustrated) which enable charging of the battery 336 of the transportation robot 30 may be formed.

Figure 9:
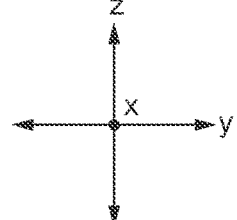
FIG. 9 is a side view of the rack 10 schematically illustrating an example of a configuration of a picking station 40 of the automated storage and retrieval system 1 according to the embodiment.
Figure 10:
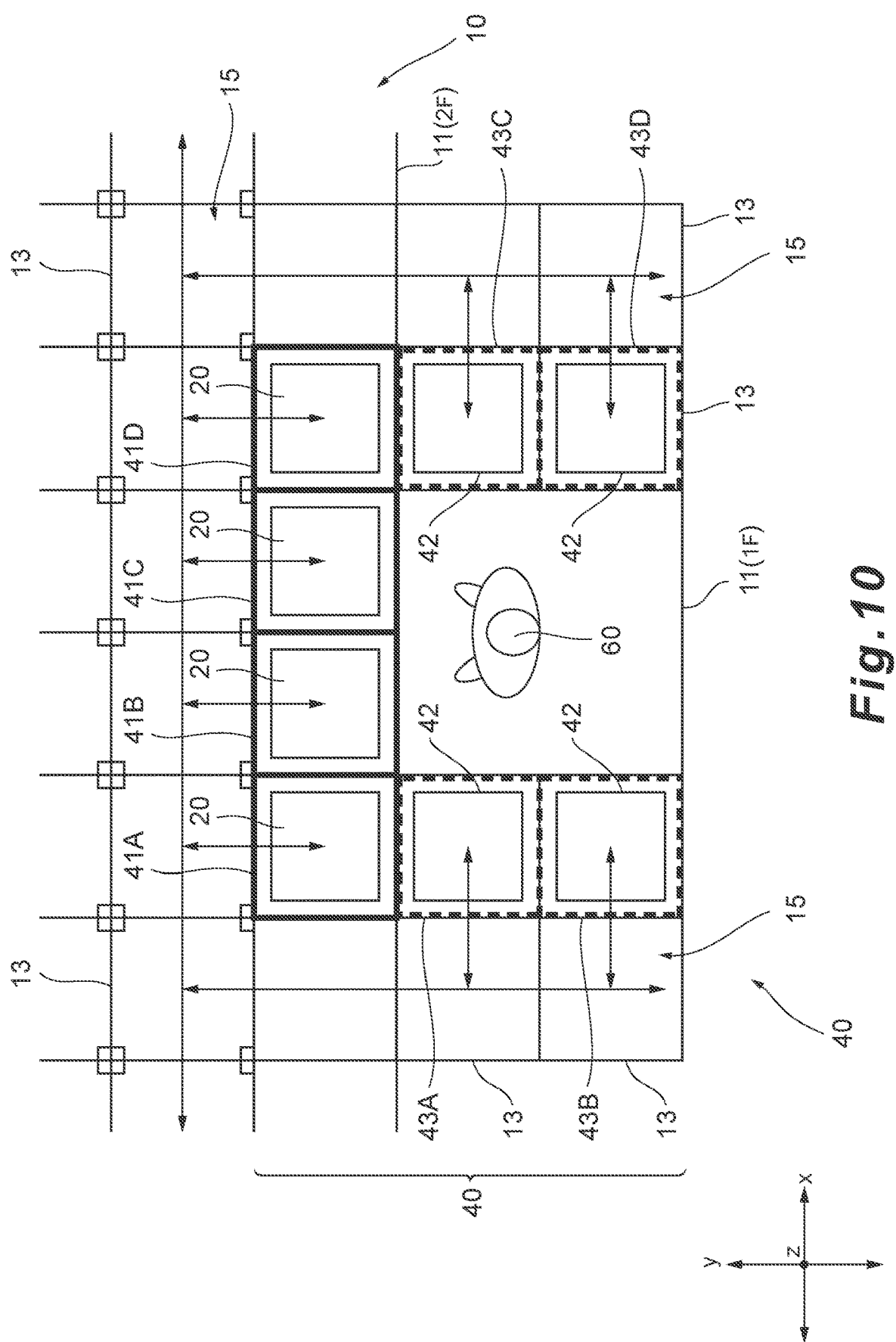
FIG. 10 is a plan view of the rack 10 schematically illustrating an example of a configuration of the picking station 40 of the automated storage and retrieval system 1 according to the embodiment.

FIG. 9 is a side view of the rack 10 schematically illustrating an example of the configuration of the picking station 40 of the automated storage and retrieval system 1 according to the embodiment. FIG. 10 is a plan view of the rack 10 schematically illustrating the example of the configuration of the picking station 40 of the automated storage and retrieval system 1 according to the embodiment. As illustrated in FIG. 9, the picking station 40 is established along the edge of the floor 11 which continues from the surface of the floor 11 of the second floor of the rack 10. More specifically, the picking station 40 is formed on the surface of the floor 11 of the second floor which extends in, for example, the y axis direction toward an outer side of an outer edge of the floors 11 of the third floor to the ninth floor. In the present embodiment, similar to the floor 11 of the second floor, the floor 11 of the first floor also extends toward the outer side of the outer edges of the floors 11 of the third floor to the ninth floor. The operator 60 stands on the surface of the floor 11 of the first floor, and does work of picking the item 23 from the storage bin 20. The height of the surface of the floor 11 of the second floor is suitable for the operator 60 whose height is, for example, 165 cm which is an average height of adults to do the work.

As illustrated in FIG. 10, the picking station 40 defines a plurality of picking positions 41A to 41D at which the storage bins 20 used for picking work of the item 23 are arranged on the floor 11 of the second floor. In the present embodiment, the four picking positions 41A to 41D are aligned adjacent to each other in the x axis direction along the edge of the rack 10. Each of the picking positions 41A to 41D occupies the one section 13 of the floor 11. The picking positions 41A to 41D are aligned in front of the operator 60 facing the rack 10, and the picking positions 41B and 41C of the picking positions 41A to 41D directly face the operator 60. As is apparent from FIG. 9, no floor 11 is arranged in a space above the picking positions 41A to 41D in the z axis direction.

On the floor 11 of the second floor, for example, the two sections 13 extend toward the outer side in the y axis direction from the picking positions 41A and 41D. These four sections 13 in total define loading positions 43A to 43D at which the items 23 are loaded to shipment bins 42 which need to be shipped to clients of orders. Each of the loading positions 43A to 43D occupies the one section 13 of the floor 11. The shipment bin 42 employs the same configuration as that of the storage bin 20. According to the present embodiment, all of the loading positions 43A to 43D are aligned to a side of the operator 60 who faces the rack 10, and directly face the operator 60. Thus, as is apparent from FIG. 10, the four picking positions 41A to 41D and the four loading positions 43A to 43D are aligned surrounding the operator 60 on the floor 11 of the second floor.

Furthermore, the sections 13 further surrounding the four picking positions 41A to 41D and the four loading positions 43A to 43D define the movement route 15 of the transportation robot 30 on the floor 11 of the second floor. Although FIG. 10 omits illustration of the lines 17 for ease of description, the lines 17 are drawn in all of the sections 13 in which the four picking positions 41A to 41D and the four loading positions 43A to 43D, and the movement routes 15 are formed. Thus, as indicated by arrows in FIG. 10, the transportation robot 30 can enter the four picking positions 41A to 41D and the four loading positions 43A to 43D from the movement routes 15. Note that the storage bin 20 is not arranged in the sections 13 forming the movement routes 15. Thus, the transportation robot 30 can transport the storage bin 20 between the storage area 14 of the rack 10 and the four picking positions 41A to 41D. On the other hand, the transportation robot 30 can transport the shipment bin 42 on which the item 23 has been loaded, to, for example, a shipping station (not illustrated) established in the rack 10.

Although the storage bins 20 are aligned on each floor 11 of the rack 10 as is apparent from FIG. 9, the storage bins 20 containing the items 23 of higher inventory turnover ratios are preferably aligned on the lower floors 11. In other words, the storage bins 20 containing the items 23 of lower inventory turnover ratios are preferably aligned in the upper floors 11. In the present embodiment, the picking stations 40 are established on the floor 11 of the second floor, and therefore the items 23 of lower inventory turnover ratios are stored on the upper floors 11 for which physical movement distances of the transportation robots 30 from the second floor are assumed to be long. Similarly, the items 23 of higher inventory turnover ratios are stored on the floors 11 which are close to the second floor and to which physical movement distances are assumed to be short, or the second floor for which the transportation elevator 16 does not need to be used.

Figure 11:
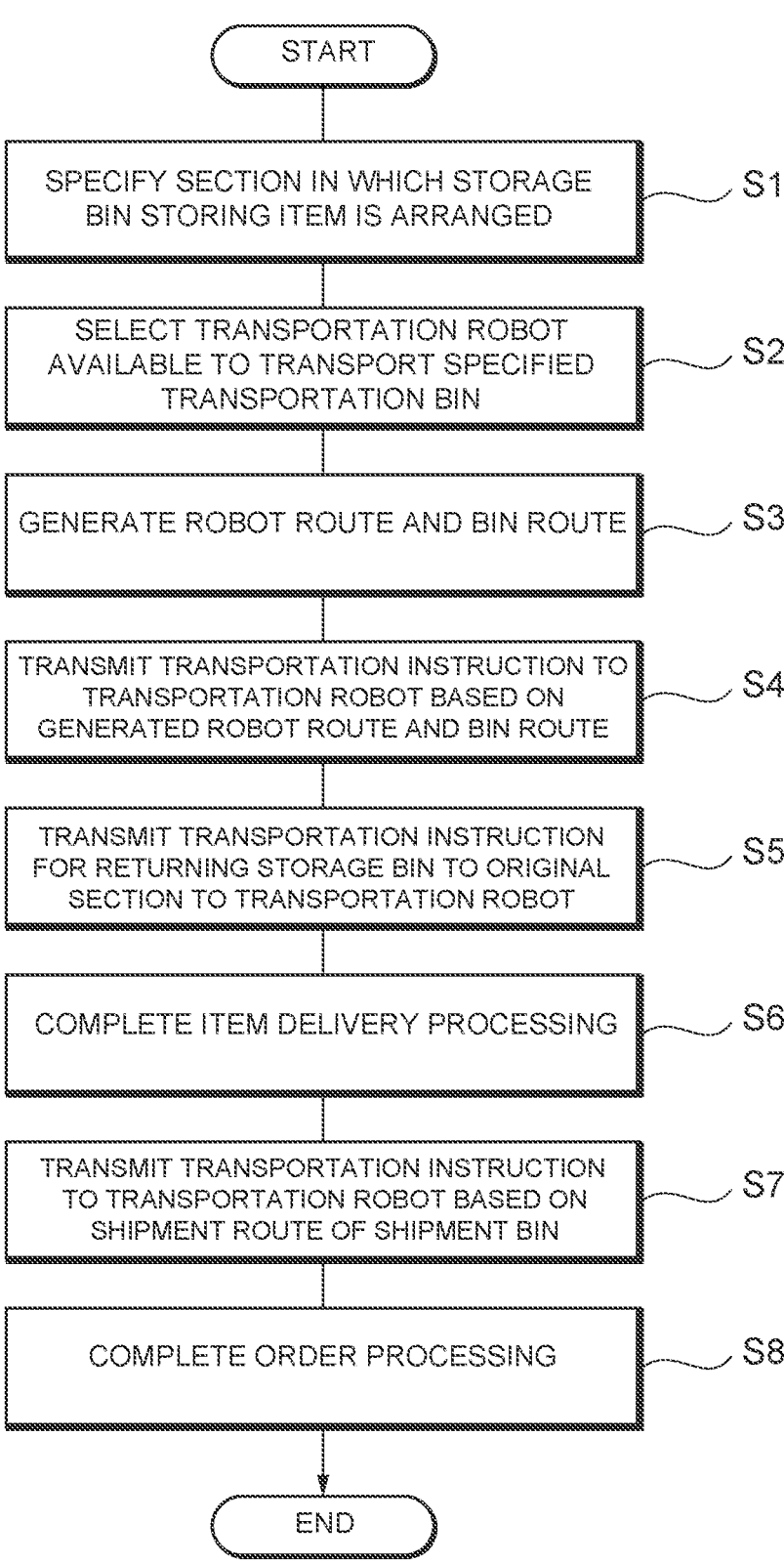
FIG. 11 is a flowchart for explaining processing of a control unit 51 of the management server 50 of the automated storage and retrieval system 1 according to the embodiment.

Hereinafter, delivery processing of the automated storage and retrieval system 1 according to the embodiment of the present disclosure will be described. FIG. 11 is a flowchart for explaining processing of the control unit 51 of the management server 50 of the automated storage and retrieval system 1 according to the embodiment. The operator 60 starts the delivery processing by using the terminal (not illustrated). The delivery processing starts from a time when, for example, the terminal specifies an order. The specified order includes an order line including at least SKUs and the number of the ordered items 23. The order line is displayed on a display screen of the terminal of the operator 60. Note that the terminal of the operator 60 is preferably electronic device terminals including, but not limited to, a personal computer, a smartphone, a tablet terminal, and a touch panel type display.

When the delivery processing is started, the device control unit 513 specifies the storage bin 20 containing each item 23 specified by the order line (step S1). More specifically, the position of the section 13 of the floor 11 storing the storage bin 20 is specified. Specifying the positions is executed for all of the items 23 specified by the order line. On the other hand, the empty shipment bin 42 used for the specified order is arranged at one of the loading positions 43A to 43D. For this arrangement, the transportation robot 30 may be used. Furthermore, as the shipment bin 42, a container such as a shipment cardboard for an orderer may be prepared in advance. The terminal of the operator 60 is notified of the loading position 43A to 43D of the empty shipment bin 42 used for the order.

The device control unit 513 selects the transportation robot 30 available for transportation of the specified storage bin 20 (step S2). For example, the transportation robot 30 whose physical movement distance to the specified storage bin 20 is the shortest is selected. Note that, in addition to or instead of the physical movement distance, the transportation robot 30 located on the same floor 11 as the floor 11 on which the specified storage bin 20 is arranged may be selected. Next, the device control unit 513 generates the robot route R1 which is a movement route from the section 13 in which the selected transportation robot 30 is currently located to the section 13 of the specified storage bin 20, and the bin route R2 which is a movement route from the section 13 of the specified storage bin 20 to one of the picking positions 41A to 41D of the picking station 40 (step S3). The device control unit 513 transmits a transportation instruction to the selected transportation robot 30 based on the generated robot route R1 and bin route R2 (step S4).

The transportation robot 30 which has received the transportation instruction moves to the specified section 13 according to the generated robot route R1. The transportation robot 30 can transmit a use request to the transportation elevator 16 to use the transportation elevator 16. The transportation robot 30 which has moved to the specified section 13 enters the space below the bottom surface 21c of the storage bin 20 according to the first configuration, and stops at the center of the section 13. The transportation robot 30 changes the configuration from the first configuration to the second configuration in response to driving of the lifting mechanism 334. Thus, the upper surface of the housing 31 of the transportation robot 30 lifts the storage bin 20, so that the transportation robot 30 holds the storage bin 20. Next, the transportation robot 30 moves to the specified picking positions 41A to 41D according to the generated bin route R2 while employing the second configuration. This movement may include movement performed by the transportation elevator 16.

The transportation robot 30 which has arrived at the specified picking positions 41A to 41D changes the configuration from the second configuration to the first configuration. The transportation robot 30 stays at this position until picking work of the item 23 is completed. This arrival of the transportation robot 30 is indirectly notified to the terminal of the operator 60 via, for example, the management server 50, or is directly notified to the terminal of the operator 60. This notification may be, for example, an indication on a display of the terminal, may be a notification using a voice, or may be a notification using projection mapping. Thus, the operator 60 picks the ordered item 23 from the storage bin 20 to load in the target shipment bin 42. When loading of the item 23 is completed, the operator 60 notifies the management server 50 of completion of loading via the terminal. The device control unit 513 which has received the notification transmits to the transportation robot 30 a transportation instruction for returning the storage bin 20 to the original section 13 in which the storage bin 20 has been arranged, based on the generated bin route R2 (step S5).

The transportation robot 30 which has received the transportation instruction changes the configuration from the first configuration to the second configuration, and lifts the storage bin 20. The transportation robot 30 transports the storage bin 20 to the original section 13 according to the bin route R2 while employing the second configuration. The transportation robot 30 which has arrived at the original section 13 changes the configuration from the second configuration to the first configuration. Thus, the storage bin 20 is returned to the original section 13. The transportation robot 30 notifies the management server 50 of that the storage bin 20 has been returned. The device control unit 513 which has received the notification completes the delivery processing of the item 23 (step S6). The device control unit 513 executes delivery processing of all of the items 23 listed in the order line specified by the order. This delivery processing of the plurality of items 23 is preferably executed simultaneously in parallel.

When loading of all of the items 23 listed in the order line is completed, the operator 60 notifies the management server 50 of completion of loading via the terminal. The device control unit 513 which has received the notification transmits a transportation instruction to the transportation robot 30 transporting the shipment bin 42 based on the movement route R3 (hereinafter referred to as a "shipping route") to the shipping station (not illustrated) provided in the rack 10 (step S7). The transportation robot 30 which has received the transportation instruction changes the configuration from the first configuration to the second configuration to lift the storage bin 20. The transportation robot 30 transports the shipment bin 42 to a destination shipping station according to the bin route R2 while employing the second configuration. When completing transportation of the shipment bin 42 to the shipping station, the transportation robot 30 notifies the management server 50 of the completion. The device control unit 513 which has received the notification completes the order processing (step S8).

According to the above automated storage and retrieval system 1, the storage bin 20 containing the item 23 specified by the order can be transported by the transportation robot 30 from the section 13 of the floor 11 of the rack 10 to the picking station 40. Mechanisms such as conveyers and operators which transport storage bins from a rack to a picking station and which are required in a conventional system are not required. Furthermore, the plurality of storage bins 20 is aligned at the plurality of picking positions 41A to 41D of the picking station 40. Consequently, the operator 60 can execute work of simultaneously picking the item 23 from each of the plurality of these storage bins 20. Efficiency of the picking work of the item 23 substantially improves. Furthermore, the storage bin 20 from which the item 23 has been picked is returned to the rack 10, so that it is possible to replace the storage bins 20 aligned at the picking positions 41A to 41D. This also contributes to making the picking work efficient.

Furthermore, the picking station 40, that is, the picking positions 41A to 41D are defined along the edge of the floor 11 which continues from the surface of the floor 11 of the second floor of the rack 10, so that the transportation robot 30 which can run on the floor 11 can easily arrive at the picking positions 41A to 41D. Furthermore, the picking stations 40 can be provided at the edge of the surface of the floor 11 of the rack 10, so that it is possible to substantially improve the degree of freedom of arrangement of the picking stations 40. In a case where, for example, in place of the operator 60, a robot arm can perform picking work of the item 23, the picking stations 40 may be provided at the edge of the surface of the upper floor 11 of the rack 10. In this case, the robot arms which can work at the picking stations 40 provided on the upper floor 11 of the rack 10 may be incorporated in the automated storage and retrieval system 1.

Furthermore, while the storage bin 20 is received on the floor 11 by the four support legs 22, the transportation robot 30 can enter the space below the bottom surface 21c of the storage bin 20, and lift the storage bin 20. That is, the transportation robot 30, when not carrying the storage bin 20, can run not only on the movement route 15 of the transportation robot 30, but also in the storage area 14 of the storage bin 20. Consequently, the number of the transportation robots 30 required to the automated storage and retrieval system 1 can be significantly reduced, thereby decreasing a possibility of the collision between the transportation robots 30. Further, the degree of freedom of arrangement of the storage bins 20 on each floor 11 substantially improves. Furthermore, the above embodiment performs an operation of returning to the original section 13 the storage bin 20 to which the item 23 has been loaded. However, the storage bin 20 may be returned to the arbitrary section 13 of the arbitrary floor 11 other than the original section 13.

Furthermore, the outline of the transportation robot 30 in plan view is defined on an inner side of the outline of the storage bin 20 in plan view likewise. That is, the transportation robot 30 is formed smaller than the storage bin 20 in plan view. Consequently, at, for example, the picking positions 41A to 41D of the picking station 40, the storage bin 20 can be aligned close to the neighboring storage bin 20. That is, for example, the four storage bins 20 can be aligned close to each other in front of the operator 60. Similarly, the storage bins 20 are also aligned close to each other on the rack 10, so that an arrangement density of the storage bins 20 improves.

Hereinafter, a first modified example will be described. According to the above-described embodiment of the present disclosure, the automated storage and retrieval system 1 includes the plurality of picking stations 40, that is, for example, the two picking stations 40. In this regard, a scene is assumed that the two first and second picking stations 40 are used for order processing. For example, a case is assumed where the respectively different first item 23 and second item 23 are listed in an order line, the first item 23 is loaded at the first picking station 40, and the second item 23 is loaded at the second picking station 40. At the first picking station 40, the operator 60 loads the first item 23 to the empty shipment bin 42 from the first storage bin 20 arranged at the picking positions 41A to 41D of the second picking station 40. Note that the operator 60 at the first picking station 40 is notified of that loading work of only the first item 23 among the items 23 in the order line is necessary.

When loading is partially completed at the first picking station, the transportation robot 30 transports the shipment bin 42 from the first picking station 40 to the second picking station 40. Note that the operator 60 at the second picking station 40 is notified of that loading work of only the second item 23 among the items 23 in the order line is necessary.

When the shipment bin 42 for which loading has been partially completed arrives at the second picking station 40, at the second picking station 40, the operator 60 loads the second item 23 from the another second storage bin 20 arranged at the picking positions 41A to 41D of the second picking station 40 to the shipment bin 42 for which loading has been partially completed. The shipment bin 42 for which loading has been completed is processed similar to the above-described embodiment.

According to this first modified example, in a case where, for example, the number of orders which need to be processed at the first picking station 40 is excessively large, that is, in a case where the first picking station 40 is in a state of an excessive load, the one order can be processed in a distributed manner by the plurality of picking stations 40. Furthermore, for example, a case is assumed where the first item 23 is a popular product for a client of an order as a result of a marketing campaign of this item 23, and the second item 23 is a personal item of this client. In this case, it is predicted that the storage bins 20 containing the first items 23 are continuously aligned at the first picking station 40, and the first picking station 40 falls into the state of the excessive load. In this case, the second item 23 which is the personal item is loaded at the second picking station 40, so that it is possible to efficiently process the order.

Another modified example provides a method for separately using the picking positions 41A to 41D and the loading positions 43A to 43D at the picking station 40 according to the items 23. Referring to FIG. 10 again, for example, the picking positions 41A and 41D do not directly face the operator 60 since the loading positions 43A and 43C are respectively arranged on the outer side in the y axis direction. Hence, in a case where the item 23 is a so-called large case product which is packaged in a unit of a plurality of identical products, the storage bin 20 containing the item 23 is preferably aligned at the picking position 41B or 41C taking easiness to pick the item 23 into account. This is realized when, for example, the device control unit 513 performs control to set the picking position 41B or 41C to a destination of the bin route R2 of the transportation robot 30.

According to another modified example, referring to FIG. 10, the picking positions 41A and 41B are relatively close to the loading positions 43A and 43B. On the other hand, the picking positions 41C and 41D are relatively close to the loading positions 43C and 43D. Hence, taking easiness of picking and loading into account, the item 23 picked from the storage bin 20 aligned at the picking positions 41A and 41B is preferably loaded to the shipment bin 42 aligned at the loading positions 43A and 43B. Similarly, the item 23 picked from the storage bin 20 aligned at the picking positions 41C and 41D is preferably loaded to the shipment bin 42 aligned at the loading positions 43C and 43D. This is realized when, for example, the device control unit 513 performs control to adjust the positions of the storage bin 20 and the shipment bin 42 at the picking station 40.

Similarly, after the item 23 is loaded to the shipment bin 42 aligned at the loading positions 43A and 43B, the item 23 to be loaded to the shipment bin 42 is next preferably picked from the storage bin 20 aligned at the picking position 41A or 41B. Furthermore, after the item 23 is loaded to the shipment bin 42 aligned at the loading positions 43C and 43D, the item 23 to be loaded to the shipment bin 42 is next preferably picked from the storage bin 20 aligned at the picking position 41C or 41D. This is realized when, for example, the device control unit 513 performs control to adjust the positions of the storage bin 20 and the shipment bin 42 at the picking station 40.

Although the rack 10 includes the floors 11 of the first floor to the ninth floor in the above-described embodiment, the number, sizes, and the like of the floors 11 may be appropriately changed according to sizes of the building 100, the storage bins 20, the shipment bins 42, the transportation robots 30, and the like as described above in the another modified example. Furthermore, in the above-described embodiment, the four picking positions 41A to 41D and the four loading positions 43A to 43D are defined. However, other numbers of the picking positions 41 and/or the loading positions 43 such as two, three, five, or six may be defined. Furthermore, the three or more picking positions 41 may directly face the operator 60.

This description discloses some embodiments of the subject matter of the present disclosure, and uses examples to enable the one of ordinary skilled in the art to carry out the embodiments of the subject matter of the present disclosure including manufacturing and using an arbitrary device and system and executing an arbitrary incorporated method. The patentable scope of the subject matter of the present disclosure is defined by the claims, and may include other examples achieved by the one of ordinary skilled in the art. These other examples intend to be within the claims in a case where the other examples include components which are not different from wordings of the claims, or in a case where the other examples include equivalent components including non-substantial differences from the wordings of the claims.

The invention claimed is:

1. An automated storage and retrieval system comprising:
a rack storing a plurality of bins for containing items, the rack includes a plurality of floors, each floor of the plurality of floors stores the plurality of bins;
a picking station for picking an item from a bin of the plurality of bins;
a transportation robot for transporting the bin of the plurality of bins between the rack and the picking station, the transportation robot configured to run along a surface of the plurality of floors; and
one or more transportation elevators for transporting the transportation robot between the plurality of floors,
wherein the picking station defines a plurality of picking positions at which a plurality of transportation robots transporting the bins of the plurality of bins are simultaneously aligned to enable picking work of an item from the bin,
wherein the plurality of picking positions is defined on at least one floor of the plurality of floors.

2. The automated storage and retrieval system according to claim 1, wherein the picking station further defines one or more loading positions at which a plurality of shipment bins for loading the items are arranged.

3. The automated storage and retrieval system according to claim 1, wherein the plurality of picking positions is defined at an edge of a floor of the plurality of floors which continues from the surface of the floor of the plurality of floors.

4. The automated storage and retrieval system according to claim 1, wherein the bin containing an item of a higher inventory turnover ratio is stored in a lower floor of the plurality of floors.

5. The automated storage and retrieval system according to claim 1, wherein the length of at least one side of the transportation robot is smaller than the length of each side of the storage bin.

6. The automated storage and retrieval system according to claim 1, wherein each transportation elevator is arranged in one section in the movement route of the transportation robot on each floor.

7. The automated storage and retrieval system according to claim 1, wherein the transportation robot can run along a line by tracing the line drawn on the floor of the rack.

8. The automated storage and retrieval system according to claim 1, wherein a plurality of picking stations is defined at the rack.

9. The automated storage and retrieval system according to claim 8, wherein the transportation robot is configured to transport the bin between the plurality of picking stations.

10. The automated storage and retrieval system according to claim 1, wherein the transportation robot which has transported the bin to the picking station stays in a space below a bin at the picking station during the picking work at the picking station.

11. The automated storage and retrieval system according to claim 10, wherein the transportation robot operates to return the bin from the picking station to the rack after the picking work at the picking station.

12. The automated storage retrieval system according to claim 1, wherein each floor of the rack being defined with a plurality of sections aligned along plane and each floor being supported by a plurality of supporting columns arranged at corner portions of the each section of the floor.

13. The automated storage retrieval system according to claim 12, wherein each bin of the plurality of bins occupies the one section of the floor.

14. The automated storage and retrieval system according to claim 1, wherein the transportation robot is configured to change its height between a first configuration in which an upper surface of a housing is set to a first height, and a second configuration in which the upper surface of the housing is set to a second height higher than the first height.

15. The automated storage and retrieval system according to claim 14, wherein in the first configuration, the transportation robot is adapted to enter the space below a bin main body from between the plurality of support legs of the storage bin, and upon changing from the first configuration to the second configuration, the transportation robot lifts and holds the storage bin on the upper surface of the housing.

16. The automated storage and retrieval system according to claim 1, wherein the plurality of bins is received on the floor the plurality of floors by a plurality of support legs extending from bottom surfaces of the plurality of bins, and the transportation robot is configured to enter a space below the bin between a bottom surface of the bin and the floor of the plurality of floors, and supports the bin so as to enable transportation of the bin by lifting the bottom surface of the bin in the space below.

17. The automated storage and retrieval system according to claim 16, wherein an outline of the transportation robot is defined on an inner side of an outline of the bin in plan view in a case where the transportation robot enters the space below the bin.

18. The automated storage and retrieval system according to claim 16, wherein each floor of the plurality of floors defines a storage area storing the plurality of bins, and a movement route allowing the transportation robot to run outside the storage area, and each of the plurality of bins faces the movement route.

19. The automated storage and retrieval system according to claim 18, wherein the storage area of the plurality of floors allows the transportation robot to run.

* * * * *